United States Patent [19] [11] 4,284,257
Murkens [45] Aug. 18, 1981

[54] PRECISION SURFACE GAGE

[76] Inventor: David W. Murkens, 724 Park Ave., Meadville, Pa. 16335

[21] Appl. No.: 72,364

[22] Filed: Sep. 5, 1979

[51] Int. Cl.³ .................................................. A47G 29/00
[52] U.S. Cl. ................................. 248/125; 33/172 R; 248/DIG. 4
[58] Field of Search ................ 248/158, DIG. 4, 655, 248/656, 676, 188.2, 346, 124, 125; 33/172 R; 403/291; 16/150

[56] References Cited

U.S. PATENT DOCUMENTS

| 1,196,244 | 8/1916 | Kinoshita | 16/150 |
| 2,177,921 | 10/1939 | Zofrey | 248/DIG. 4 |
| 2,469,904 | 5/1949 | Szuba | 248/124 |
| 2,611,659 | 9/1952 | Hadley | 16/150 UX |
| 3,044,740 | 7/1962 | Pearce et al. | 248/124 |
| 3,121,907 | 2/1964 | Stebbins | 16/150 X |
| 3,202,310 | 8/1965 | Tibbets | 16/150 X |
| 3,599,339 | 8/1971 | Adamczyk | 33/172 R |
| 3,672,620 | 6/1972 | Fink | 248/125 |
| 3,833,195 | 9/1974 | Anton | 248/125 |
| 3,881,303 | 5/1975 | Krafka | 16/150 X |

FOREIGN PATENT DOCUMENTS 273333 9/1964 Australia ..................................... 16/150

Primary Examiner—J. Franklin Foss

[57] ABSTRACT

A precision surface gage for precision measurements is disclosed having a top base and a bottom base connected together at one end by a flat spring and a screw for swinging the top base relative to the bottom base extending through the top base and engaging the bottom base and an indicator is supported on a rod supported on the top base.

11 Claims, 6 Drawing Figures

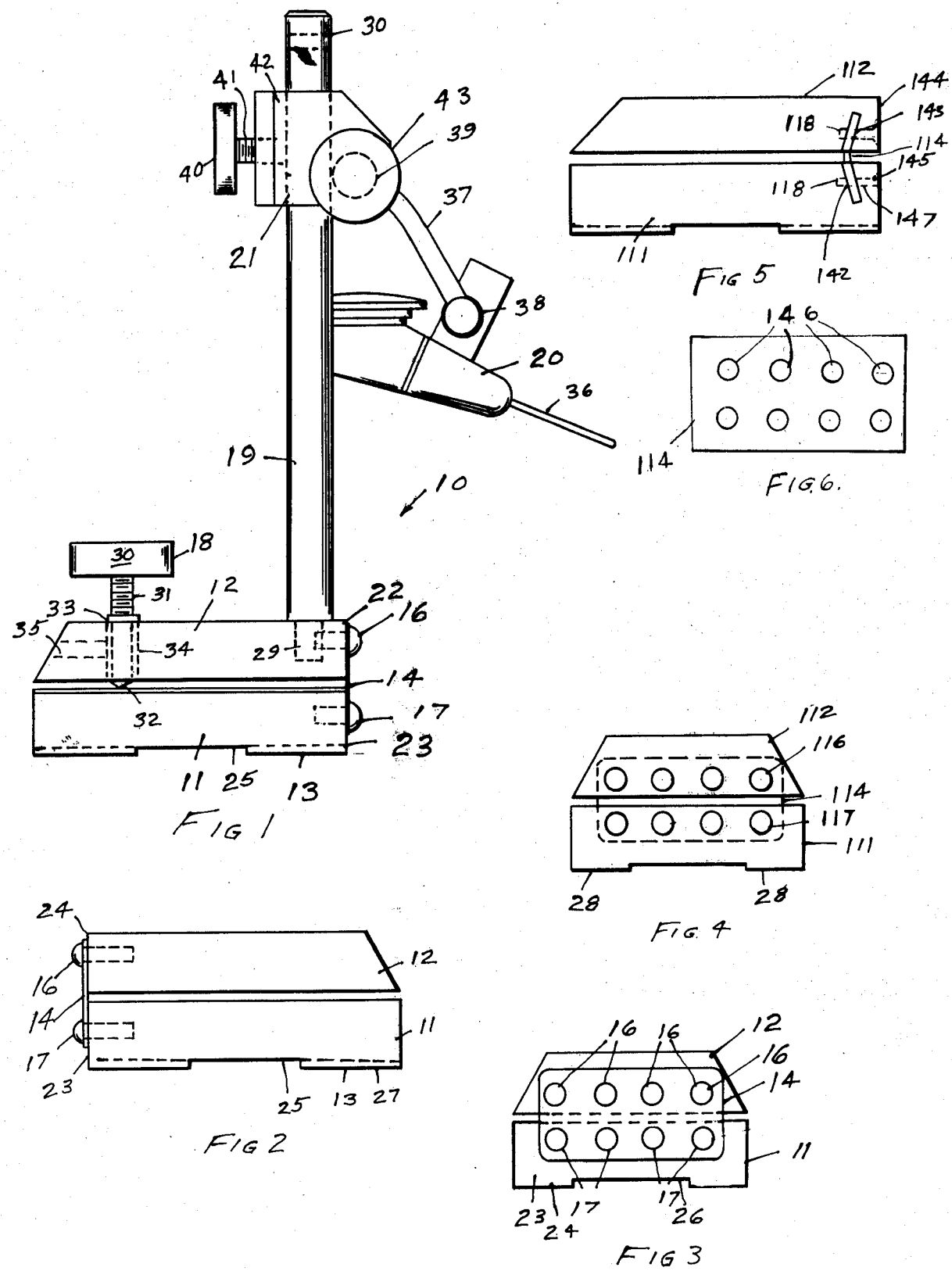

PRECISION SURFACE GAGE

REFERENCE TO PRIOR ART

Various indicator supports have been suggested such as disclosed in the U.S. Pat. No. 2,177,921; U.S. Pat. No. 2,469,904; and U.S. Pat. No. 2,780,871; but none of these supports have the stability and accuracy that applicant's support provides.

OBJECTS OF THE INVENTION

It is an object of the invention to provide an improved indicator support.

Another object of the invention is to provide an indicator support that is simple in construction, economical to manufacture and simple and efficient to use.

Another object of the invention is to provide an indicator support that will support an indicator for precision measurements which can be readily and precisely adjusted and efficient to use.

With the above and other objects in view, the present invention consists of the combination and arrangement of parts hereinafter more fully described, illustrated in the accompanying drawings and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

FIG. 1 is a side view of an indicator support according to the invention.

FIG. 2 is a partial view taken from the side opposite FIG. 1 of the indicator support base.

FIG. 3 is an end view of the support shown in FIGS. 1 and 2.

FIG. 4 is a view similar to FIG. 3 of another embodiment of the invention.

FIG. 5 is a view similar to FIG. 2 of another embodiment of the invention.

FIG. 6 is a view of the spring.

DETAILED DESCRIPTION OF THE DRAWINGS

Now, with more particular reference to the drawings, indicator support indicated generally at 10 is shown made up of a bottom base 11 adapted to rest on a tool plate, machine frame or other suitable supporting surfaces. The top base 12 is swingably connected to the bottom base 11 by means of the leaf spring 14. The top base 12 is disposed above the bottom base and the rear edge 24 is supported flush with the rear edge 23 of the bottom base 11. Spring 14 is attached to the top base 12 by means of the screws 16 and the spring 14 is attached to bottom base 11 by screws 17. The bottom base 11 may have grooves 24 in the bottom surface to facilitate supporting at level on a supporting surface and the central area may have a longitudinal recess 25 and a lateral recess 26 to provide four corner pads 27. These corner pads are slotted at 28 to facilitate resting on a supporting surface.

The rod 19 is threaded at 29 and the threaded end is received in a threaded hole in the top base member 12. The lower threaded end 29 may be, for example, ⅜" diameter and have 16 threads per inch thereon. An opening 30 is provided in the upper end of the rod 19 which may receive a tube or rod for tightening it.

There will preferably be four threaded holes in the rear end of the top base member 12 and the bottom base member 11 for receiving the screws 16 and 17 which pass through the holes in the spring 14. Spring 14 may be in the form of a plate, for example, 1/16" thick and approximately equal in width to the width of the top base member and the bottom base member. Each screw 31 may have a knurled end wheel 30 with a threaded portion 31 which may, for example, be ¼" in diameter and the point 32 which engages the lower base member 11. The point could be slanted at approximately 45° with a small radius on the end where contact is made.

The stamp 31 is received in an internally threaded holder 33 that is finished to precisely the desired dimensions on its outside surface and received in a suitable bore 34 and the top base member 12. The holder 33 is held in place by a suitable screw in the threaded opening 35 in the top base member, the screw also providing a fine adjustment if the threads wear. Indicator 20 is of a type familiar to those skilled in the art having an article engaging tip 36 thereon and supported on the holder 17 in a manner familiar to those skilled in the art. The holder is in the form of a rod which may, for example, be ¼" in diameter clamped to the indicator 38 and to the slide 21 at 39. The slide has a hand wheel 40 which is received through threaded holes 41 in the slide 21 and the end of the threaded portion 41 engages the gap 42 clamping the holder 21 in desired vertical position on the rod 19. The knob 43 clamps the rod 37 in position on the holder so that the holder may be adjusted to the desired position.

In the embodiment of the invention shown in FIGS. 4, 5 and 6 the bottom base 111 is similar in construction to the bottom base 11 in the first embodiment, but it has a slot 142 for receiving the lower end of the spring 114. The upper end of the spring 114 is received in the slot 143 in the top base member 112. The top base member 112 has four threaded holes 143 and 147 receiving the screws 118.

The inner ends of holes 143 are threaded and the outer ends of holes 147 are enlarged and unthreaded. Screws 118 pass freely through holes 146 in spring 114 and through holes 143 and 147 and threadably engage holes 142. The heads of screws 118 are countersunk into holes 147 and clamp the ends of the spring rigidly in the slots 142 and 143.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. An indicator support comprising,
   a bottom base member (11) adapted to be supported on a supporting surface,
   a top base member (12),
   said top base member being disposed above said bottom base member,
   said bottom base member having means adjacent an edge for attaching the lower edge of a leaf spring thereto,
   said top base member having means for attaching the upper edge of said leaf spring thereto whereby said top base member is swingably supported on said bottom base member, a vertical rod fixed to said top base member and extending upwardly therefrom, an indicator supported on said rod and slidable vertically thereon, a threaded screw extending through said top base member and engaging said bottom base member whereby said top base member is swung relative to said bottom base member and said spring is deflected whereby said indicator is swung relative to a vertical line thereby adjusting said position of said dial indicator.

2. The indicator support recited in claim 1 wherein said top base member has a flat edge thereon and said bottom base member has a flat edge thereon and said flat surfaces are disposed in a common vertical plane, and said means for attaching said springs to said top base member and said bottom base members comprising screws extending through said spring into said top base member and second screws extending through said spring into said bottom base member whereby said spring is rigidly clamped to said top base member and said bottom base member.

3. The indicator support recited in claim 1 wherein said means attaching said flat spring to said top base member comprises upwardly extending slot in said top base member and a downwardly extending slot in said bottom base member, said leaf spring upper edge being received in said upwardly extending slot in said top base member and in said downwardly extending slot in said bottom base member and screws extending into threaded holes in said top base member, second screws extending through threaded holes in said bottom base member clamping said leaf spring to said top base member and to said bottom base member.

4. The indicator support recited in claim 1 wherein said top base member has a hole extending downwardly down through and the threaded sleeve is received in said hole and clamping means clamping said sleeve to said top base member and said threaded screw extending through said threaded sleeve and engaging said bottom base member.

5. The indicator support recited in claim 1 wherein said spring is in the form of a relatively thin, flat plate.

6. The indicator support recited in claim 5 wherein said means for attaching said spring to said top base member comprises a downwardly facing groove in the bottom of said top base member and an upwardly facing groove in the top of said bottom base member, one end of said spring being received in said upwardly facing groove and another end of said spring being received in said downwardly facing groove.

7. The indicator support recited in claim 6 wherein at least one of said grooves is disposed at an acute angle to the bottom of said top base member whereby said top base member is urged to swing toward said bottom base.

8. The indicator support recited in claim 7 wherein both said grooves in said base member and said grooves in said bottom base member are disposed at acute angles to said bottom of said top base.

9. The indicator support recited in claim 8 wherein said spring has holes therein, said top base member and said bottom base member have holes therein and threaded means extending through said holes in said top base member and through said spring and other threaded means extend through said holes in said bottom base member and through said spring holding said spring in said grooves.

10. The indicator support recited in claim 9 wherein said holes intersect said grooves in said top base member and the inner ends of said holes in said top base member and in said bottom base member are threaded.

11. The indicator support recited in claim 10 wherein said screws extend through said holes in said spring and said screws are threadably received in the inner ends of said holes and said screws have heads overlying said base urging a part of said base outward of said groove into clamped relation with said spring holding said spring in rigid clamped relation.

* * * * *